(12) United States Patent  
Gao et al.

(10) Patent No.: US 9,398,574 B2
(45) Date of Patent: Jul. 19, 2016

(54) METHOD AND EQUIPMENT FOR INFORMATION TRANSMISSION BASED ON COORDINATED MULTIPLE POINT TRANSMISSION

(75) Inventors: Qiubin Gao, Beijing (CN); Ranran Zhang, Beijing (CN); Wenhong Chen, Beijing (CN); Ying Peng, Beijing (CN); Hui Li, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 155 days.

(21) Appl. No.: 14/237,923
(22) PCT Filed: Aug. 7, 2012
(86) PCT No.: PCT/CN2012/079772
§ 371 (c)(1),
(2), (4) Date: Apr. 25, 2014
(87) PCT Pub. No.: WO2013/020498
PCT Pub. Date: Feb. 14, 2013

(65) Prior Publication Data
US 2015/0085763 A1 Mar. 26, 2015

(30) Foreign Application Priority Data
Aug. 9, 2011 (CN) .......................... 2011 1 0227198

(51) Int. Cl.
*H04W 72/04* (2009.01)
*H04L 1/00* (2006.01)
(Continued)

(52) U.S. Cl.
CPC ........... *H04W 72/0413* (2013.01); *H04B 7/024* (2013.01); *H04B 7/0417* (2013.01);
(Continued)

(58) Field of Classification Search
CPC . H04W 72/0413; H04W 72/02; H04W 72/06; H04W 24/08; H04B 7/024; H04B 7/0417; H04L 1/0026; H04L 5/0035
See application file for complete search history.

(56) References Cited

U.S. PATENT DOCUMENTS

2010/0203887 A1 8/2010 Kim
2010/0272040 A1* 10/2010 Nam .................. H04J 13/0077
370/329
(Continued)

FOREIGN PATENT DOCUMENTS

CN 101848485 A 9/2010
CN 102291211 A 12/2011
WO 2010143873 A2 12/2010

OTHER PUBLICATIONS

International Search Report for PCT/CN2012/079772, ISA/CN, Beijing, mailed Nov. 15, 2012.
(Continued)

*Primary Examiner* — Paul H Masur
(74) *Attorney, Agent, or Firm* — Harness, Dickey & Pierce, P.L.C.

(57) ABSTRACT

Embodiments of the present invention disclose an information transmission method and equipment based on CoMP transmission. In the method, a user equipment determines a main transmission point. The user equipment determines RANK information of the main transmission point as well as channel state information corresponding to the RANK information. The user equipment sends the RANK information of the main transmission point and the channel state information to a network side equipment. In the embodiments of the present invention, the UE reports channel state information of limited RANK of every transmission point, channel state information of unlimited RANK of the main transmission point, and relative phase information between the transmission points, etc., to the network side equipment, thereby helping the network side to better implement flexible selection and dynamic switchover of transmission schemes. Moreover, it does not notably increase feedback expenses for the UE.

20 Claims, 5 Drawing Sheets

(51) Int. Cl.
  *H04B 7/02* (2006.01)
  *H04B 7/04* (2006.01)
  *H04L 5/00* (2006.01)
  *H04W 24/08* (2009.01)
  *H04W 72/02* (2009.01)
  *H04W 72/06* (2009.01)

(52) U.S. Cl.
  CPC ............ *H04L1/0026* (2013.01); *H04L 5/0035* (2013.01); *H04W 24/08* (2013.01); *H04W 72/02* (2013.01); *H04W 72/06* (2013.01)

(56) References Cited

U.S. PATENT DOCUMENTS

| | | | |
|---|---|---|---|
| 2010/0291940 A1 | 11/2010 | Koo et al. | |
| 2011/0141987 A1* | 6/2011 | Nam ..................... | H04L 1/0003 370/329 |
| 2012/0052895 A1* | 3/2012 | Clerckx ............ | H04W 72/0426 455/509 |
| 2012/0087332 A1 | 4/2012 | Kim et al. | |
| 2013/0021925 A1* | 1/2013 | Yin ........................ | H04B 7/024 370/252 |
| 2013/0272206 A1* | 10/2013 | Li .......................... | H04B 7/024 370/328 |
| 2014/0355529 A1* | 12/2014 | Zhu .................... | H04N 21/2365 370/329 |

OTHER PUBLICATIONS

Thinese Office Action for Application No. 201110227198.3 dated Feb. 21, 2013, and its English translation thereof.
Thinese Office Action for Application No. 201110227198.3 dated Jul. 23, 2013 and its English translation thereof.
Huawei, "CSI-RS Design to Support Miltiple-Cell Measurement," San Francisco, CA, USA, Feb. 22-26, 2010.
Huawei, RITT, Texas Instruments, CMCC, "Discussion on Timing Advance Issue in CoMP & Text Proposal," Ljubljana, Slovenia, Jan. 12-16, 2009.
European Office Action for Application No. 12822035.7 dated Jun. 8, 2015.
European Search Report for Application No. 12822035.7 dated Oct. 15, 2014.
LG Electronics, "Phase 1 CoMP Simulation Evaluation Results and Analysis for Full Buffer," Barcelona, Spain, May 9-13, 2011.

* cited by examiner

METHOD AND EQUIPMENT FOR INFORMATION TRANSMISSION BASED ON COORDINATED MULTIPLE POINT TRANSMISSION

CROSS REFERENCE TO RELATED APPLICATIONS

The present application is a U.S. National Phase application under 35 U.S.C. §371 of International Application No. PCT/CN2012/079772, filed on Aug. 7, 2012, which claims the priority of a Chinese Patent Application No. 201110227198.3 submitted to the State Intellectual Property Office of China on Aug. 9, 2011, entitled "A method and equipment for information transmission based on coordinated multiple point transmission", the contents of both of which are incorporated in their entirety into the present application.

FIELD

This disclosure relates to the field of communication technology, and particularly, relates to a method and equipment for information transmission based on coordinated multiple point transmission.

BACKGROUND

Coordinated multiple point transmission (COMP) technology is a coordination between multiple geographically separated transmission points. Generally speaking, the multiple transmission points can be base stations of different cells or can be multiple separated transmission equipments within a single cell. Here, the CoMP technology can be mainly divided into two categories: CS/CB (Coordinated Scheduling/Beamforming) and JP (Joint Processing).

CS/CB uses the coordination of time, frequency, and space resources between cells to distribute mutually orthogonal resources for different user equipments (UES), in order to prevent interference between each other. Because the interference between cells is the main reason limiting the performance of edge UES of the cells, CS/CB can improve the performance of the edge UEs of the cells through lowering the interference between the cells.

FIG. 1 is a schematic diagram of CS/CB. Through joint scheduling of 3 cells, 3 possible interfering UEs can be dispatched onto mutually orthogonal resources (namely, onto different resources which include time, frequency, and space etc.), thereby effectively preventing interference between the cells.

The difference between the JP scheme and the CS/CB scheme is that the JP scheme can send data to a UE from multiple cells simultaneously in order to enhance the received signal of the UE. As shown in FIG. 2, which is a schematic diagram of JP, 3 cells send data to a UE on the same resource, and the UE simultaneously receives signals from the multiple cells. If all of the coordinating cells send the same data to the UE, then the useful signal from the multiple cells will be superimposed to improve signal reception quality of the UE. Thus, demodulation performance of UEs, especially the performance of edge UEs of the cells, may be improved.

In the current technology, a special form of the JP scheme is dynamic transmission point selection. That is, a transmission point for sending data to a UE is dynamically selected based on channel conditions between the UE and the transmission point, and each time only 1 transmission point sends data to the UE. FIGS. 3A and 3B are schematic diagrams of the dynamic transmission point selection. In FIG. 3A, transmission point 1 is selected as the transmission point from which to send data to the UE. In FIG. 3B, transmission point 2 is selected as the transmission point from which to send data to the UE.

In the process of implementing the present invention, the inventor discovered that at least the following problems exist in the current technology.

There is not a suitable method by which to send feedback for every scheme (CS/CB, JP, dynamic transmission point selection, etc.) in the current technology.

SUMMARY

A method and equipment for information transmission based on CoMP transmission are set forth in embodiments of the present invention, in order to provide reasonable feedback for channel state information.

In order to achieve the above mentioned purpose, an embodiment of the present invention provides a method for information transmission based on coordinated multipoint transmission, including:

determining, by a user equipment (UE), a main transmission point;

determining, by the UE, RANK information of the main transmission point, and channel state information corresponding to the RANK information; and sending, by the UE, the RANK information and the channel state information of the main transmission point to a network side equipment.

An embodiment of the present invention provides an information transmission method based on CoMP, including:

a network side equipment receiving RANK information and channel state information relating to a main transmission point from a UE; and the network side equipment carrying out processing based on the RANK information and the channel state information.

An embodiment of the present invention provides a user equipment, including:

a first determination module, configured to determine a main transmission point;

a second determination module, configured to determine RANK information of the main transmission point as well as channel state information corresponding to the RANK information;

a transmission module, configured to send the RANK information and the channel state information of the main transmission point to the network side equipment.

An embodiment of the present invention provides a network side equipment, including:

a reception module, configured to receive RANK information and channel state information of a main transmission point from a UE; and a processing module, configured to carry out processing based on the RANK information and the channel state information.

Compared to the existing technologies, the embodiments of the present invention have at least the following benefits. In an embodiment of the present invention, a UE reports channel state information of limited RANK of every transmission point, channel state information of unlimited RANK of a main transmission point, relative phase information between transmission points, etc., to a network side equipment. It can thereby help the network side to better implement flexible selection and dynamic switchover of transmission schemes. Moreover, it does not notably increase feedback expenses for the UE.

DETAILED DESCRIPTION

Figure 1:
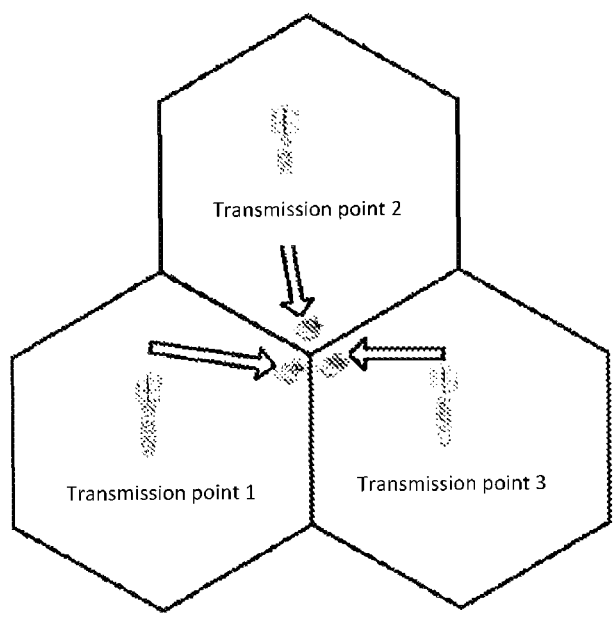
FIG. 1 shows a schematic diagram of CS/CB in the current technology.
Figure 2:
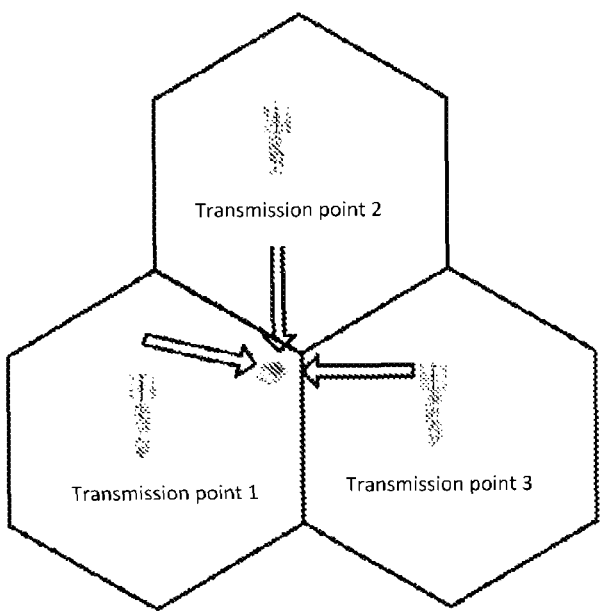
FIG. 2 shows a schematic diagram of JP in the current technology.
Figure 3A:
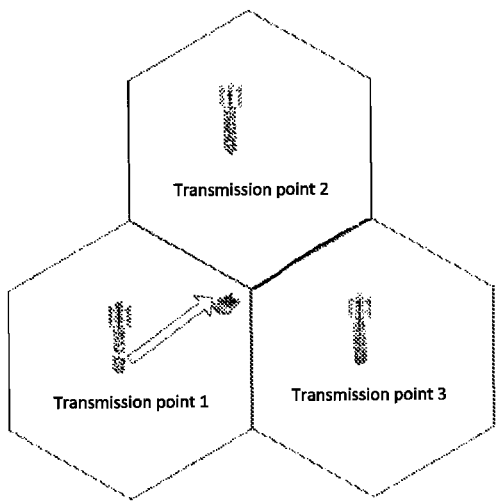
FIGS. 3A and 3B show schematic diagrams of dynamic transmission point selection in the current technology.
Figure 3B:
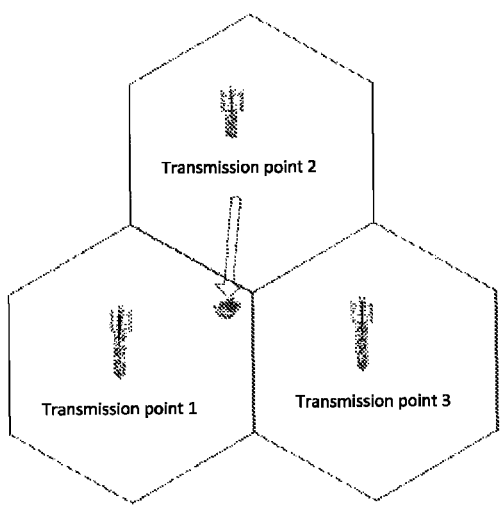

The present invention is described in detail hereinafter with reference to the accompanying drawings and embodiments.

In the process of realizing the present invention, the inventor noted that: in order to support every type of CoMP transmission schemes, a network side equipment may acquire channel state information between a transmission point and a UE. The channel state information can be acquired through channel state information reported by the UE.

When the channel state information is reported by the UE, a reporting mode may be: information reported by the UE can support all types of transmission schemes, such as CS/CB, JP, and dynamic transmission point selection, etc. That is, the feedback of the UE is universal. Under this reporting mode, after the UE reports the channel state information, the network side equipment can select an appropriate transmission scheme based on deployment scenarios and service conditions as well as other such factors. The specifically selected transmission scheme is transparent to the UE, thereby achieving a comparatively higher degree of flexibility.

In actual implementation, a universal feedback can be achieved through a multiple level feedback method, namely, by sending channel state information of every transmission point in a measurement set, and feeding back phase information and/or amplitude information between the transmission points, respectively. The measurement set is a set of transmission points allocated to the UE by the network side equipment, and the UE may observe the channel state information of the transmission points within the measurement set and provide feedback. Afterwards, the network side equipment may construct channel state information between a transmission point within the measurement set and the UE based on these two types of information.

As an example, it is supposed that there are two transmission points included in the measurement set. Channels from the two transmission points to the UE are denoted as H1 and H2, separately. The UE chooses precoding matrixes W1 and W2 for the two transmission points, respectively, wherein the precoding matrix is considered as the channel state information. Phase and amplitude information, g, between the two cells can be accessed by the method described below:

$$\hat{g} = \arg\max_{g} \left\| \begin{bmatrix} H_1 & H_2 \end{bmatrix} \begin{bmatrix} w_1 \\ w_2 g \end{bmatrix} \right\|^2.$$

In the method, g belongs to a predefined codebook set. If the column number of W1 and W2 is denoted by M, then g is a diagonal matrix of M*M. When M=1, g degenerates to a scalar quantity. If g is a scalar quantity, then a codebook set A of g can be a point in a 16QAM (Quadrature Amplitude Modulation) constellation.

$$A = \frac{1}{\sqrt{10}}\{1+j, 1+3j, 3+j, 3+3j, 1-j, 1-3j, 3-j, 3-3j, -1+j,$$
$$-1+3j, -3+j, -3+3j, -1-j, -1-3j, -3-j, -3-3j\}$$

It can also be a point in a QPSK (Quadrature Phase Shift Keying) constellation.

$$A = \frac{1}{\sqrt{2}}\{1+j, 1-j, -1+j, -1-j\}$$

In the aforementioned scheme, all transmission points are treated equally by the UE during feedback. But in actuality, these transmission points have different functions. For example, in the CS/CB scheme and the dynamic transmission point selection scheme, only 1 point may send information to the UE. The channel information of this transmission point may require higher precision than the rest transmission points. The transmission point should be able to support space multiplexing transmission (i.e., allowing RANK (i.e., the number of spatial multiplexing data layers)>1).

Due to the processing methods of different schemes, the inventor discovered that a dynamic transmission point selection scheme actually only needs the channel state information of 1 transmission point. To support other transmission schemes, information concerning other transmission points also need to be fed back, which has no significance in regard to the dynamic transmission point selection scheme. Furthermore, to enable the JP scheme to support high RANK transmission may not bring about any obvious performance upgrades. Instead, it may bring about a higher level of complexity when performing feedback. Therefore, the JP scheme only needs to feedback channel state information of RANK 1 of every transmission point.

In light of the aforementioned discovery, the present invention provides an information transmission method and equipment based on coordinated multipoint transmission so as to satisfy the requirements on feedback contents of every type of schemes.

The following will integrate the drawings of the present invention to clearly explain the technical scheme of the present invention in complete and obvious detail. Obviously, the embodiments described are only part of embodiments of the present invention and not all embodiments of the present invention. Based on the embodiments of the present invention, any embodiments obtained by those skilled in the art are within the scope of protection of the present invention, under the premise that he does not put forth any creative efforts.

Embodiment 1

Figure 4:
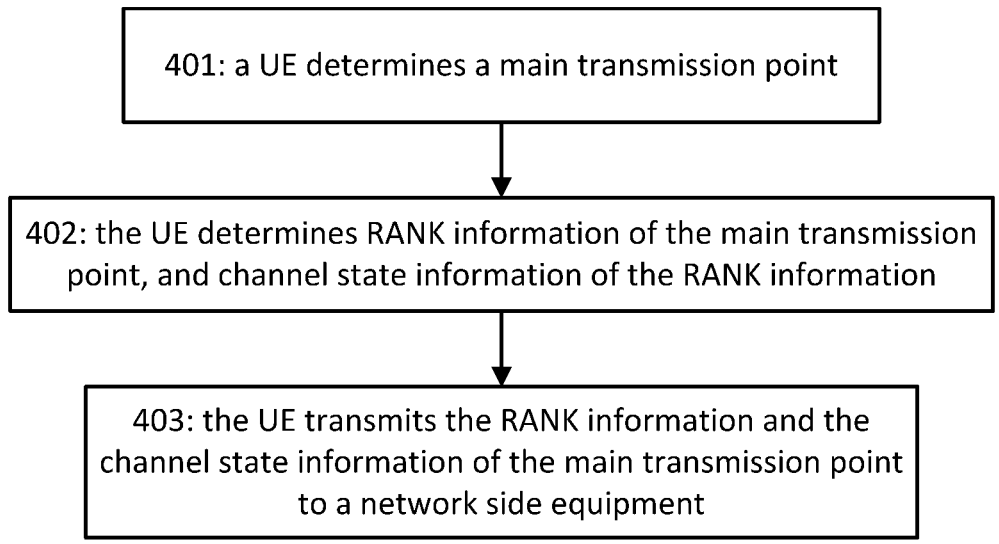
FIG. 4 shows a flow diagram of an information transmission method based on coordinated multipoint transmission provided in Embodiment 1 of the present invention.

Embodiment 1 provides an information transmission method based on coordinated multiple point transmission. An explanation will be carried out based on an example of a UE side processing. As shown in FIG. 4, the information transmission method based on the coordinated multiple point transmission includes the following steps.

In step 401, a UE determines a main transmission point.

The network side equipment can configure a measurement set for the UE. The configuration information of the measurement set may include identification information for multiple transmission points as well as pilot configuration information for multiple transmission points. Or, the configuration information of the measurement set only includes pilot configuration information for multiple transmission points. The pilot configuration information includes, but is not limited to one or any combination of the following: a CSI-RS transmission period, offset and resource location, sequence, antenna port number information, transmission power, etc.

Therefore, based on the configuration information of the measurement set, when the network side equipment configures the main transmission point for the UE, the UE can then determine the main transmission point based on the configuration information of the main transmission point. That is, the network side equipment can designate any one or more transmission points within a measurement set as the main transmission point, and the UE can be informed of the main transmission point based on the situation. Or, the UE can, in accordance with an agreed upon manner, determine the main transmission point (such as by using a transmission point of a specific location within the measurement set as the main transmission point). Or, the UE can determine the main transmission point based on channel conditions of the measurement set configured by the network side equipment or a subset within the measurement set.

In this embodiment, when the main transmission point is determined in accordance with an agreed upon manner or based on channel conditions (namely, determined by the UE itself), the UE still needs to send an identifier of the main transmission point to the network side equipment, such as an index value within the measurement set or the numbering within the subset of the measurement set. The subset is a set that the network allows the UE to choose as the main transmission point.

In Step 402, the UE determines RANK information of the main transmission point as well as channel state information corresponding to the RANK information. Herein, the channel state information includes but is not limited to: a precoding matrix indicator (PMI) and/or a channel quality indicator (CQI).

In this embodiment, the UE can estimate a channel from a transmission point in the measurement set to the UE, and acquire the relevant channel state information. Thus, in regard to the determined main transmission point, the UE can freely select RANK information (namely Rank Indication (RI) information), and determine the channel state information (such as PMI/CQI) corresponding to the RANK information.

In Step 403, the UE sends the RANK information and the channel state information of the main transmission point to the network side equipment, namely, the UE sends the RI/PMI/CQI of the main transmission point to the network side equipment.

In this embodiment, in regard to all transmission points within the measurement set, the UE may also determine limited RANK information of the transmission points as well as channel state information corresponding to the limited RANK information, and send the channel state information corresponding to the limited RANK information of the transmission points to the network side equipment. Further, the UE may transmit the limited RANK information of the transmission points to the network side equipment.

Herein, when the UE receives configuration information of the measurement set from the network side equipment, the configuration information of the measurement set can include identification information of the transmission point and pilot configuration information of the transmission point (or only include pilot configuration information of the transmission point) as well as limited RANK information of the transmission point. Thus, the UE can determine the limited RANK information of the transmission point. For example, when the RANK is limited to 1, the UE may then determine the channel state information of every transmission point for RANK 1 (such as PMI/CQI), and feedback the channel state information having the RANK of 1 to the network side equipment.

In this embodiment, in regard to all of the transmission points within the measurement set, the UE can also determine RANK information of a transmission point as the RANK information of the main transmission point as well as determine the channel state information corresponding to the RANK information of the transmission point, and send the channel state information corresponding to the transmission point's RANK information to the network side equipment.

In this embodiment, after the UE receives the configuration information of the measurement set from the network side equipment, it can also calculate relative phase information of every transmission point in the measurement set relative to the main transmission point, and then send the relative phase information to the network side equipment.

In summary, in this embodiment of the present invention, the UE reports the channel state information of limited RANK of every transmission point, the channel state information of unlimited RANK information of the main transmission point, relative phase information between transmission points, etc., to the network side equipment. It can thereby help the network side to better implement flexible selection and dynamic switchover of transmission schemes. Moreover, it does not notably increase feedback expenses for the UE.

Embodiment 2

Embodiment 2 of this invention provides an information transmission method based on coordinated multiple point transmission. The processing on a network side equipment may be illustrated as an example. Herein, the equipment for implementing the invention at the network side (such as a base station equipment) may be a device that can control multiple transmission points, or may be a piece of equipment among the multiple transmission points, which will not be further addressed in this disclosure.

Figure 5:
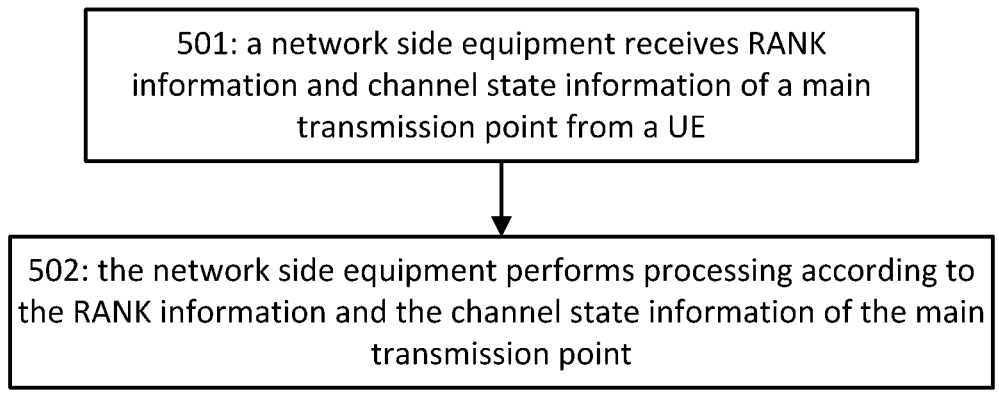
FIG. 5 shows a flow diagram of an information transmission method based on coordinated multipoint transmission provided in Embodiment 2 of the present invention.

As shown in FIG. 5, the information transmission method based on the coordinated multiple point transmission includes the following steps.

In Step 501, the network side equipment receives RANK information and channel state information from the UE regarding the main transmission point. Herein, the channel state information includes but is not limited to: PMI and/or CQI.

In Step 502, the network side equipment carries out processing based on the RANK information and the channel state information. For example, the network side equipment realizes operations including transmission point selection, user scheduling, precoding calculation, MCS selection, etc., based on the channel state information reported by the UE, and ultimately transmits data to the UE.

In the embodiment, prior to Step 501, the network side equipment may configure a measurement set for the UE. The configuration information of the measurement set includes identification information for multiple transmission points as well as pilot configuration information of multiple transmission points; or it can include only the pilot configuration information of the multiple transmission points. The pilot configuration information includes but is not limited to any one of or any combination of the following: a CSI-RS transmission, offset and resource position, sequencing, antenna port number information, transmission power information, etc.

Afterwards, the network side equipment may send the configuration information of the measurement set to the UE, and designate one or more transmission points within the measurement set as the main transmission point. Afterwards, the UE selects the main transmission point based on the configuration information of the measurement set.

In this embodiment, the network side equipment can also send limited RANK information of the transmission point to the UE, and receive channel state information corresponding to the limited RANK information of the transmission point from the UE. Furthermore, the network side equipment can also receive the limited RANK information of the transmission point and corresponding channel state information from the UE. Moreover, the network side equipment can also receive the channel state information corresponding to the RANK information of the transmission point from the UE, wherein the RANK information for the transmission point is RANK information for the main transmission point.

In this embodiment, the network side equipment can also receive relative phase information of every transmission point within the measurement set relative to the main transmission point from the UE.

In summary, in this embodiment, the UE reports the channel state information of the limited RANK of every transmission point, channel state information of the unlimited RANK of the main transmission point, relative phase information between transmission points, etc., to the network side equipment. It can thus help the network side to better implement flexible selection and dynamic switchover of transmission schemes without notably increasing the UE feedback expenses.

Embodiment 3

Figure 6:
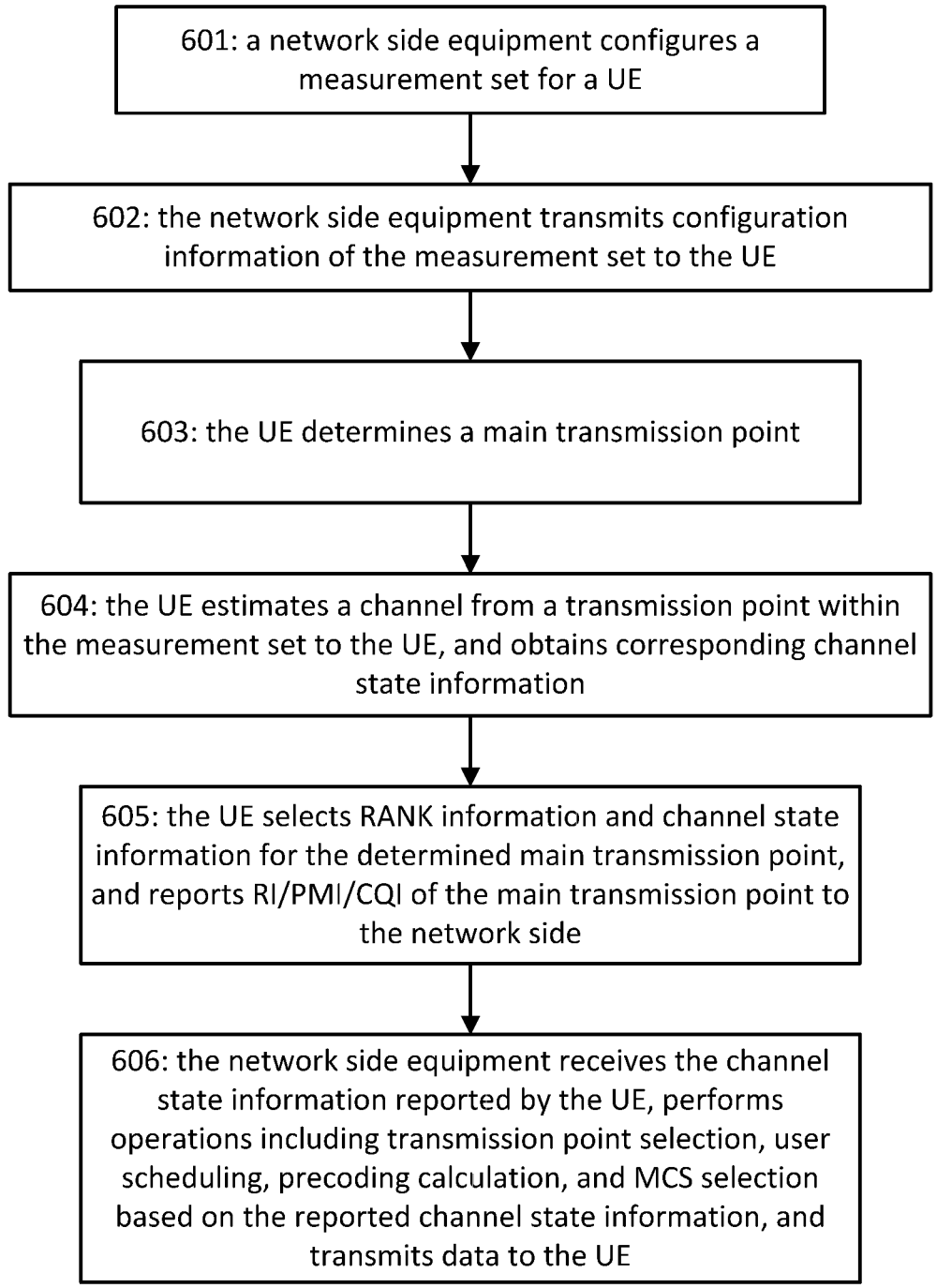
FIG. 6 shows a flow diagram of an information transmission method based on coordinated multipoint transmission provided in Embodiment 3 of the present invention.

Embodiment 3 of this invention provides an information transmission method based on coordinated multipoint transmission. The processing on the network side equipment and the UE side is illustrated as an example. The equipment of this invention implemented at the network side (such as a base station equipment) may be a device that can control multiple transmission points, or can be a piece of equipment among the multiple transmission points. As shown in FIG. 6, the information transmission method based on coordinated multipoint transmission includes the following steps.

In Step 601, the network side equipment configures a measurement set for the UE. The configuration information of the measurement set includes identification information of many transmission points as well as pilot configuration information of many transmission points; or, only includes pilot configuration information of many transmission points. The pilot configuration information includes but is not limited to one of or any combination of the following: a CSI-RS transmission period, offset and resource position, sequencing, antenna port number information, transmission power information, etc.

In Step 602, the network side equipment sends configuration information of the measurement set to the UE.

In Step 603, the UE determines the main transmission point.

In this embodiment, the network side equipment can configure the main transmission point for the UE, namely, it designates any one or more transmission points within the measurement set as the main transmission point. Or, the UE can determine the main transmission point according to a stipulated manner, such as designating a transmission point in a particular position include in the measurement set as the main transmission point. Or, the UE can automatically determine the main transmission point. The UE selects one or more transmission points in the measurement set or in a subset of the measurement set as the main transmission point based on channel conditions.

In Step 604, the UE estimates the channel from the transmission point within the measurement set to the UE, and acquires corresponding channel state information.

In Step 605, with regard to the determined main transmission point, the UE freely selects RANK information as well as corresponding channel state information (such as PMI/CQI), and reports RI/PMI/CQI of the main transmission point to the network side.

In this embodiment, if the main transmission point is determined by the UE itself, then the UE may report an identifier of the main transmission point, such as an index value in the measurement set or a numbering in a designated subset within the measurement set. The subset is a set within which the network allows the UE to select the main transmission point.

In this embodiment, in regard to all transmission points within the measurement set, the UE can also determine channel state information of the limited RANK. In an example, the RANK is limited as 1, then channel state information for RANK 1 of every transmission point is determined. Then, the UE reports the corresponding channel state information of the limited RANK of every transmission point to the network side.

In this embodiment, in regard to all transmission points within the measurement set, the UE can also determine a RANK as the RANK of the main transmission point, determine the corresponding channel state information, and report the channel state information corresponding to the RANK of every transmission point to the network side equipment.

Alternatively, in this embodiment, the UE can also calculate relative phase information of every transmission point within the measurement set relative to the main transmission point, and report it to the network side equipment.

In Step 606, the network side equipment receives channel state information reported by the UE, carries out selection of a transmission point, user scheduling, precoding calculation, modulation and coding style (MCS) selection, etc., based on the channel state information reported by the UE, and ultimately transmits data to the UE.

It needs explaining that, in this embodiment, the channel state information reported by the UE may be carried on a physical uplink control channel or on a physical uplink shared channel.

In summary, in this embodiment, the UE reports channel state information of limited RANK of every transmission point, an identifier of the main transmission point, channel state information of unlimited RANK of the main transmission point, and relative phase information between transmission points, etc., to the network side equipment. Thus, it can help the network side to better implement flexible selection and dynamic switchover of transmission schemes without notably increasing the UE feedback expenses.

Embodiment 4

Figure 7:
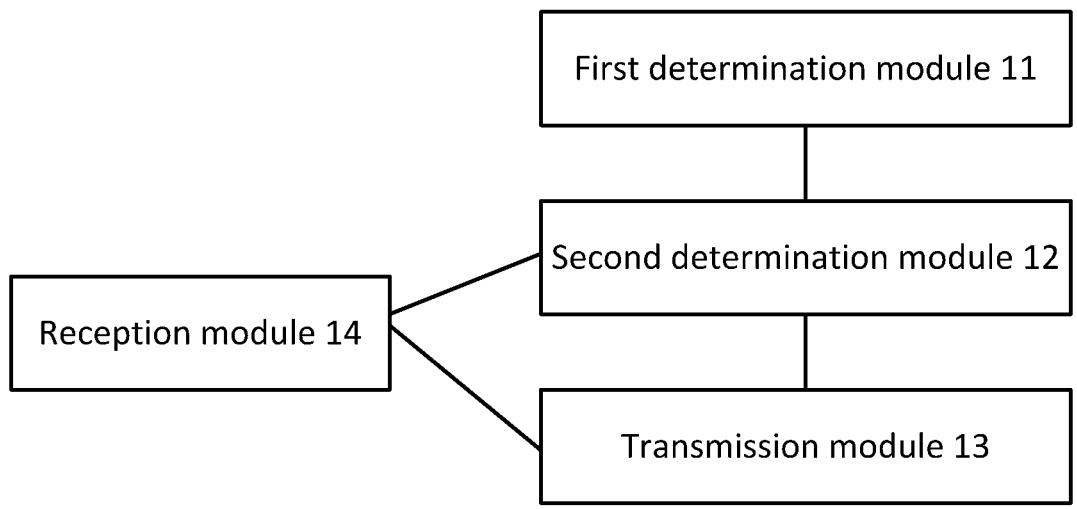
FIG. 7 shows a schematic diagram of the composition of a user equipment provided in Embodiment 4 of the present invention.

Based on the same inventive concept as described above, this embodiment also provides a user equipment. As shown in FIG. 7, the user equipment includes:

a first determination module 11, configured to determine a main transmission point;

a second determination module 12, configured to determine RANK information of the main transmission point as well as its corresponding channel state information; and a transmission module 13, configured to send the RANK information and the channel state information of the main transmission point to a network side equipment.

When the network side equipment configures the main transmission point for the user equipment, the first determination module 11 is configured to determine the main transmission point based on the configuration information of the main transmission point; or, determine the main transmission point according to an appointed manner; or, determine the main transmission point based on channel conditions within a measurement set or within a subset of the measurement set configured by the network side equipment.

The transmission module 13 is also configured to send an identifier of the main transmission point to the network side equipment when the main transmission point is determined according to the appointed manner or based on the channel conditions.

The second determination module 12 is also configured to determine limited RANK information of transmission points as well as channel state information corresponding to the limited RANK information.

The transmission module 13 is also configured to send the channel state information of the limited RANK information of the transmission point to the network side equipment.

The transmission module 13 is further configured to send the limited RANK information of the transmission point to the network side equipment.

The user equipment also includes: a reception module 14, configured to receive configuration information of the measurement set from the network side equipment. The configuration information of the measurement set includes identification information of the transmission point, pilot configuration information of the transmission point, and limited RANK information of the transmission point; or, includes pilot configuration information as well as limited RANK information of the transmission point.

The reception module 14 is configured to receive configuration information of the measurement set from the network side equipment. The configuration information of the measurement set includes identification information of the transmission point and pilot configuration information of the transmission point, or includes pilot configuration information of the transmission point.

The second determination module 12 is also configured to take the transmission point's RANK information as RANK information of the main transmission point, and determine channel state information corresponding to the transmission point's RANK information.

The transmission module 13 is also configured to send the corresponding channel state information of the RANK information of the transmission point to the network side equipment.

The reception module 14 is configured to receive configuration information of the measurement set from the network side equipment. The configuration information of the measurement set includes: identification information of the transmission point and pilot configuration information of the transmission point, or includes pilot configuration information of the transmission point.

The transmission module 13 is also configured to calculate relative phase information of every transmission point in the measurement set relative to the main transmission point, and send the relative phase information to the network side equipment.

The channel state information includes a precoding matrix indicator (PMI) and/or a channel quality indicator (CQI).

In the embodiment, every module in the equipment of the present invention can be integrated in one body, and can also be deployed separately. The aforementioned modules can be merged as one module, and can also be further split up into multiple individual modules.

Embodiment 5

Figure 8:
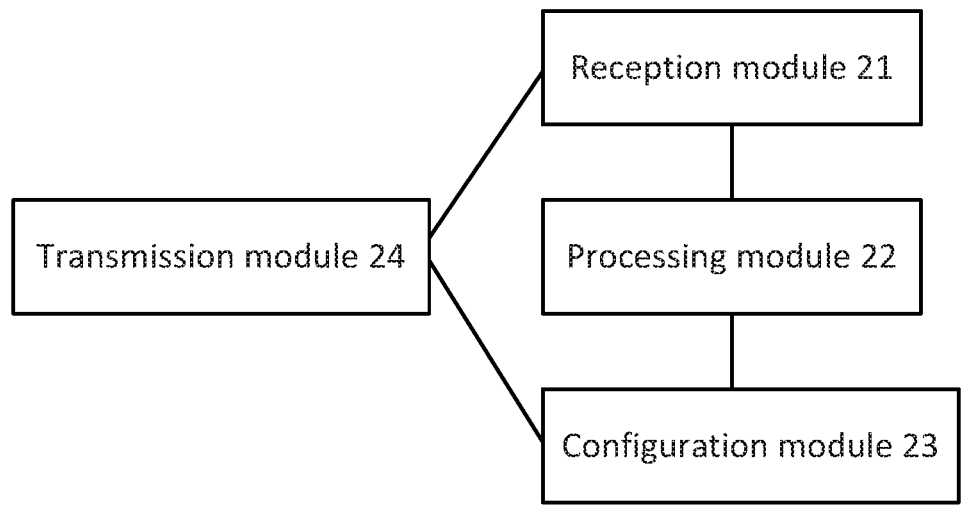
FIG. 8 shows a schematic diagram of the composition of a network side equipment provided in Embodiment 5 of the present invention.

Based on the same inventive concept in the method described above, an embodiment of this invention also provides a network side equipment. As shown in FIG. 8, the network side equipment includes the following modules.

A reception module 21 is configured to receive RANK information and channel state information of a main transmission point from a UE.

A processing module 22 is configured to carry out processing based on the RANK information and the channel state information.

A configuration module 23 is also included in the network side equipment, which is configured to allocate a measurement set for the UE. The configuration information of the measurement set includes identification information of multiple transmission points and pilot configuration information of the transmission points, or includes pilot configuration information of the transmission points.

The transmission module 24 is configured to send configuration information of the measurement set to the UE, and designate one or more transmission points within the measurement set as the main transmission point.

The reception module 21 is further configured to receive channel state information corresponding to limited RANK information of a transmission point from the UE.

The reception module 21 is further configured to receive limited RANK information of the transmission point as well as corresponding channel state information from the UE.

The transmission module 24 is configured to send limited RANK information of the transmission point to the UE.

The reception module 21 is also configured to receive from the UE channel state information corresponding to the RANK information of the transmission point, wherein the RANK information of the transmission point is RANK information of the main transmission point.

The reception module 21 is also configured to receive relative phase information of every transmission point relative to the main transmission point within the measurement set of the user equipment.

The channel state information includes a precoding matrix indicator (PMI) and/or a channel quality indicator (CQI).

Herein, every module in the equipment in this invention can be integrated in one body, or can also be deployed separately. The aforementioned modules can be merged as one module, or can also be further split up into multiple sub-modules.

Through the above description of the implementation manners, those skilled in the art can clearly understand that this invention can be implemented through support from software and a necessary universal hardware platform, or can naturally also be implemented through hardware, but in many cases the former is a better method. Based on this understanding, the technical scheme of this invention essentially, or in terms of parts contributed to the prior art, can be embodied in the form of a software product. This computer software product can be stored in a storage medium, and includes several instructions for using a computer device (which can be a personal computer, server, or network equipment, etc.) to implement the method of the embodiments in the present invention.

Those skilled in the art can understand that the figures are only diagrams of preferred embodiments and that not all the modules or processes in the figures are required in this invention.

Those skilled in the art can understand that the modules in the equipment in the embodiments can be distributed and embodied within the equipment according to the description of the embodiments, and can also undergo appropriate variations and embodied in one or more equipment different from the described embodiments. The modules in the aforementioned embodiment can be merged as one module, or can also be further split up into multiple individual modules.

The serial number of the aforementioned embodiments is only for the purpose of its description and is not representative of the merits and drawbacks of the embodiments. The disclosure above only mentions a few specific embodiments of the invention, however, the invention is not only limited to these. Anyone who is skilled in the art can think of changes that would be covered under the scope of protection of this invention.

The invention claimed is:

1. A method for information transmission based on coordinated multipoint transmission (CoMP), comprising:
    determining, by a user equipment (UE), a main transmission point;
    determining, by the UE, RANK information of the main transmission point, and channel state information corresponding to the RANK information, wherein the RANK refers to a number of spatial multiplexing data layers; and
    sending, by the UE, the RANK information and the channel state information of the main transmission point to a network side equipment;
    determining, by the UE, limited RANK information of a transmission point as well as channel state information corresponding to the limited RANK information; and
    sending, by the UE, the channel state information corresponding to the limited RANK information of the transmission point to the network side equipment.

2. The method of claim 1, wherein determining by the UE the main transmission point comprises:
    determining, by the UE, the main transmission point based on configuration information of the main transmission point when the network side equipment configures the main transmission point for the UE; or
    determining, by the UE, the main transmission point according to an agreed upon manner; or
    determining, by the UE, the main transmission point based on channel conditions within a measurement set or within a subset of the measurement set configured by the network side equipment.

3. The method of claim 1, further comprising:
    sending by the UE the limited RANK information of the transmission point to the network side equipment.

4. The method of claim 1, wherein determining by the UE the limited RANK information of the transmission point comprises:
    receiving by the UE configuration information of the measurement set from the network side equipment;
    wherein the configuration information of the measurement set comprises identification information of a transmission point, pilot configuration information of the transmission point, and limited RANK information of the transmission point; or comprises pilot configuration information of the transmission point, and limited RANK information of the transmission point.

5. The method of claim 1, further comprising:
    the UE receiving configuration information of the measurement set from the network side equipment, wherein the configuration information of the measurement set comprises identification information of a transmission point and pilot configuration information of the transmission point, or comprises pilot configuration information of the transmission point;
    the UE determining the RANK information of the main transmission point as RANK information of the transmission point, and determining the channel state information corresponding to the RANK information of the transmission point; and
    the UE sending the channel state information corresponding to the RANK information of the transmission point to the network side equipment.

6. An information transmission method based on coordinated multipoint transmission (CoMP), comprising:
    a network side equipment receiving RANK information and channel state information relating to a main transmission point from a User Equipment (UE), wherein the RANK refers to a number of spatial multiplexing data layers; and
    the network side equipment carrying out processing based on the RANK information and the channel state information;
    wherein the network side equipment receiving the channel state information corresponding to limited RANK information of a transmission point from the UE.

7. The method of claim 6, further comprising:
    the network side equipment configuring a measurement set for the UE, wherein configuration information of the measurement set comprises identification information of multiple transmission points and pilot configuration information of the transmission points, or comprises pilot configuration information of the transmission points; and
    the network side equipment sending the configuration information of the measurement set to the UE, and designating one or more transmission points in the measurement set as a main transmission point.

8. The method of claim 6, further comprising:
    the network side equipment receiving the limited RANK information of the transmission point as well as corresponding channel state information from the UE.

9. The method of claim 6, wherein, prior to the network side equipment receiving the channel state information corresponding to the limited RANK information of the transmission point from the UE, the method further comprises:
    the network side equipment sending the limited RANK information of the transmission point to the UE.

10. The method of claim 6, further comprising:
    the network side equipment receiving the channel state information corresponding to the RANK information of the transmission point from the UE, wherein the RANK information of the transmission point is RANK information of the main transmission point.

11. A user equipment (UE), comprising one or more processors, and a memory for storing one or more modules to be executed by the one or more processors, wherein the one or more modules comprise a first determination module, a second determination module and a transmission module,
the first determination module is to determine a main transmission point;
the second determination module is to determine RANK information of the main transmission point as well as channel state information corresponding to the RANK information, wherein the RANK refers to a number of spatial multiplexing data layers; and
the transmission module is to send the RANK information and the channel state information of the main transmission point to the network side equipment;
wherein the second determination module is further to determine limited RANK information of a transmission point as well as channel state information corresponding to the limited RANK information; and
the transmission module is further to send the channel state information corresponding to the limited RANK information of the transmission point to the network side equipment.

12. The user equipment of claim 11, wherein the first determination module is to:
determine the main transmission point based on the configuration information of the main transmission point when the network side equipment configures the main transmission point for the UE; or, determine the main transmission point according to an agreed upon manner; or, determine the main transmission point based on channel conditions within a measurement set or within a subset of the measurement set configured by the network side equipment.

13. The user equipment of claim 11, wherein the transmission module is further to send the limited RANK information of the transmission point to the network side equipment.

14. The user equipment of claim 11, wherein the one or more modules further comprise a reception module,
the reception module is to receive configuration information of the measurement set from the network side equipment, wherein the configuration information of the measurement set comprises identification information of the transmission point, pilot configuration information of the transmission point, and limited RANK information of the transmission point; or, comprises pilot configuration information of the transmission point, and limited RANK information of the transmission point.

15. The user equipment of claim 11, wherein the one or more modules further comprise a reception module,
the reception module is to receive configuration information of the measurement set from the network side equipment, wherein the configuration information of the measurement set comprises identification information of the transmission point and pilot configuration information of the transmission point, or comprises pilot configuration information of the transmission point;
the second determination module is further to determine the RANK information of the main transmission point as RANK information of the transmission point, and determine the channel state information corresponding to the RANK information of the transmission point; and
the transmission module is further to send the channel state information corresponding to the RANK information of the transmission point to the network side equipment and/or is further to calculate relative phase information of every transmission point relative to the main transmission point in the measurement set and send the relative phase information to the network side equipment.

16. A network side equipment, comprising one or more processors, and a memory for storing one or more modules to be executed by the one or more processors, wherein the one or more modules comprise a reception module and a processing module,
the reception module is to receive RANK information and channel state information of a main transmission point from a User Equipment (UE), wherein the RANK refers to a number of spatial multiplexing data layers; and
the processing module is to carry out processing based on the RANK information and the channel state information;
wherein the reception module is further to receive from the UE the channel state information corresponding to limited RANK information of a transmission point.

17. The network side equipment of claim 16, wherein the one or more modules further comprise a configuration module and a transmission module,
the configuration module is to configure a measurement set for the UE, wherein the configuration information of the measurement set comprises identification information of multiple transmission points and pilot configuration information of the transmission points, or comprises pilot configuration information of the transmission points; and
the transmission module, configured is to send the configuration information of the measurement set to the UE, and designate one or more transmission points within the measurement set as the main transmission point.

18. The network side equipment of claim 16, wherein the reception module is further configured to receive the limited RANK information of the transmission point as well as the corresponding channel state information from the UE.

19. The network side equipment of claim 16, wherein the one or more modules further comprising: comprise a transmission module,
the transmission module, configured is to send the limited RANK information of the transmission point to the UE.

20. The network side equipment of claim 16, wherein the reception module is further configured to receive the channel state information corresponding to the RANK information of the transmission point from the UE, wherein the RANK information of the main transmission point serves as RANK information of the transmission point; and/or
the reception module is further configured to receive relative phase information of every transmission point in the measurement set relative to the main transmission point.

* * * * *